P. MUELLER.
SELF CLOSING COCK WITH CHECK.
APPLICATION FILED MAY 22, 1916.

1,228,584.

Patented June 5, 1917.

Witness
Philip E. Barnes

Inventor
Philip Mueller
By Eugene Cushman
Attorney

UNITED STATES PATENT OFFICE.

PHILIP MUELLER, OF DECATUR, ILLINOIS.

SELF-CLOSING COCK WITH CHECK.

1,228,584.  Specification of Letters Patent.  Patented June 5, 1917.

Application filed May 22, 1916. Serial No. 99,161.

*To all whom it may concern:*

Be it known that I, PHILIP MUELLER, a citizen of the United States, residing at Decatur, in the county of Macon and State of Illinois, have invented new and useful Improvements in Self-Closing Cocks with Checks, of which the following is a specification.

The present invention relates to self-closing cocks, so-called, for the reason that they are provided with means, such as a spring, which keeps the valve of the cock in closed condition except when the handle is turned and the valve is lifted against the pressure of the spring, and immediately the handle is released the valve is returned to its seat. It has for its object to provide a simple and efficient check or stop which will limit the movements of the valve and valve operating parts to just that extent which is desirable and necessary to effect a proper opening of the valve, thus doing away with unnecessary movement of the valve and preventing the derangement of the parts by careless users who not infrequently overthrow and strain the parts and subject them to unnecessary wear.

While it is broadly old to provide valves with stops of various kinds, the particular construction which I have devised is particularly adapted for the type of cock mentioned, namely, the self-closing cock, it being so disposed as to effectively control the opening movement of the valve and being of such character as to not require the fitting of any small parts, the valve being assembled in the usual manner, and yet when so assembled presenting checks or stops which will guard against the overthrowing or straining of the valve, the stop or check which I have provided being preferably cast or formed integrally with the usual parts of the valve.

In the drawings herewith I have shown one embodiment of my device, and in said drawings,—

Figure 1:
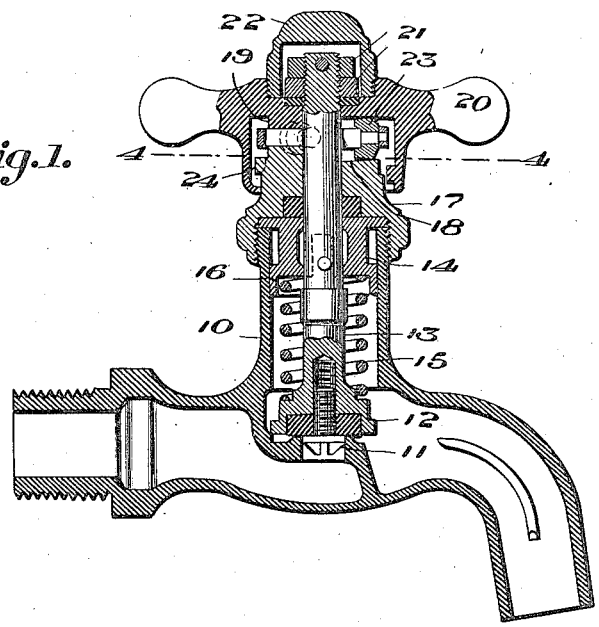
Figure 1 is a sectional view on a vertical plane of a compression cock embodying my construction.
Figure 2:
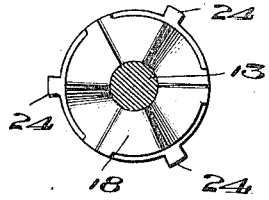
Fig. 2 is a top plan view of a gland nut provided with the stop elements.
Figure 3:
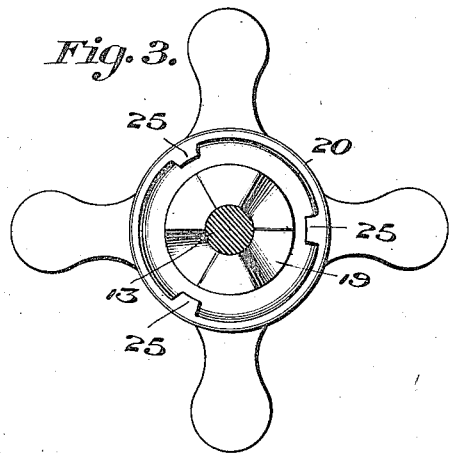
Fig. 3 is a view in plan of the under side of the operating handle showing the coöperating check elements applied thereto.
Figure 4:
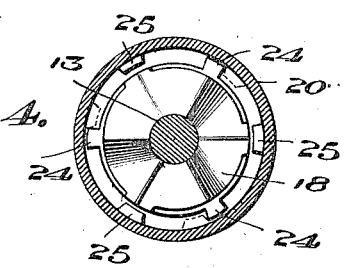
Fig. 4 is a view substantially on the line 4—4 of Fig. 1 to show the relation of the stop elements when assembled.

Referring to the drawings by numbers, like numbers indicating like parts in the several views, 10 indicates the cock body which may be of any usual or desired construction having the usual valve seat 11 and a valve 12 of any suitable construction. The stem 13 of the valve 12 passes upwardly through the valve casing 14, and encircling said stem 13 is the spring 15 bearing against the valve 12 at its lower end with its upper end bearing against the abutment 16, which abutment is held in place by the gland nut 17, the arrangement being such that when assembled the spring 15 is tensioned and tends always to close the valve.

The said gland nut 17 is provided on its upper surface with the usual cam tracks 18, and opposed to these cam tracks are the complementary cam tracks 19 formed in the recess of the handle 20, the said handle 20 being secured to the stem 13 by any suitable fastening means, such as the lock washers 21 threaded to the stem at its upper end and housed within the usual index cap 22. Between the cam surfaces 18 and 19 are the actuating or lifting rollers 23 carried by a suitable spider, which intervening rollers serve to elevate the handle and open the valve as is customary when the handle is turned.

The said gland nut 18 is provided with one or more projections 24 which extend outwardly from its side wall and which projections are designed to coöperate with similar projections or stops 25 extending inwardly from the peripheral wall of the recessed handle 20, this handle having a recess of sufficient depth to inclose and house the upper end of the gland nut so as to give a finished appearance and protect the assembled operating parts heretofore mentioned. The said projections 24 and 25 are so disposed relative to one another, when the valve parts are assembled, that they will permit an angular movement of the handle 20 sufficient to give the necessary opening to the valve, and will then check further rotation of the handle after the valve has been brought to its open position, and strain and unnecessary wear and tear upon the parts or overthrowing of the handle is avoided.

It will be observed that the stops 24 and 25 are so disposed that they get out of register vertically by reason of the rising and falling movement of the handle 20 due to its elevation by the rollers traveling over the spiral cam tracks, the present form showing in Fig. 1 the stop 25 in its lowermost position with the valve closed, and it will be seen that it extends below the stop 24 on the gland nut when in its lowermost position and is of sufficient length so that it will not rise above the stop 24 as the handle lifts, but the stops will lap each other and engage.

While I have shown a particular form of self-closing work or compression cock, namely, the well known Mueller type of work, I do not limit myself to the details of construction, as these may be varied within a wide range mechanically without departing from my invention, and I do not limit myself except in so far as I am limited by the terms of the appended claims.

I claim:—

1. In a self-closing valve, the combination of a body-portion having a valve-seat, a valve having a stem, means tending to close said valve, an operating handle on said stem having a depending skirt to house the upper part of the valve body and the operating parts between said handle and body-portion, means between said handle and body-portion to lift said valve and stem when said handle is rotated, stop means on said body-portion, and stop means on the skirt of said handle which are brought into registering contact upon rotation and lift of said handle, so as to limit rotation of said handle and lift of said valve.

2. In a self-closing valve, the combination of a body-portion having a valve-seat, a valve having a stem, means tending to close said valve, an operating handle on said stem having a depending skirt to house the upper part of said body-portion and the operating parts between said handle and body-portion, means between said handle and body-portion to lift said valve and stem when said handle is rotated, stop means on the exterior of said body-portion, and stop means on the interior of the skirt of said handle, said stop means being offset vertically but adapted to be brought into registering contact upon rotation and lift of said handle, so as to limit rotation of said handle and lift of said valve.

3. In a self-closing valve, the combination of a body-portion having a valve-seat, a valve having a stem, means tending to close said valve, an operating handle on said stem having a depending skirt to house the upper part of said body-portion and the operating means between said handle and body-portion, means between said handle and body-portion to lift said valve and stem when said handle is rotated, radially projecting stop means on the exterior of said body-portion, and radially projecting stop means on the interior of the skirt of said handle, the opposed edges of said stop means being adapted to be brought into registering contact when said handle is rotated so as to limit rotation of said handle and lift of said valve.

4. In a self-closing valve, the combination of a body portion having a valve seat, a valve having a stem, means tending to close said valve, an operating handle on said stem having a depending skirt to house the upper part of said body portion and the operating parts between said body portion and handle, means between said handle and body portion to lift said valve and stem when the handle is rotated, stops integral with and projecting radially from the exterior of said body portion and disposed equidistant thereabout, and stops integral with and projecting radially of the interior of the skirt of the handle and being angularly spaced thereabout to correspond to the stops on said body portion, the stops on said body portion being vertically offset from the stops on said handle but being in such relation thereto that upon rotation and lift of the handle they will be brought into registering contact so as to limit rotation of said handle and lift of the valve.

In testimony whereof I have hereunto set my hand in presence of two subscribing witnesses.

PHILIP MUELLER.

Witnesses:
J. W. WELLS,
FRED R. PEEBLES.